(12) United States Patent
Smith et al.

(10) Patent No.: US 11,933,694 B1
(45) Date of Patent: Mar. 19, 2024

(54) WIND TUNNEL HAVING LOW LATENCY DATA PUBLISHING

(71) Applicant: United States Government as Represented by the Secretary of the Air Force, Wright Patterson AFB, OH (US)

(72) Inventors: Paul Smith, Beavercreek, OH (US); Tina Reynolds, Fairborn, OH (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 338 days.

(21) Appl. No.: 17/445,352

(22) Filed: Aug. 18, 2021

(51) Int. Cl.
*G01M 9/04* (2006.01)
*G06F 13/40* (2006.01)
*G06F 16/25* (2019.01)

(52) U.S. Cl.
CPC .......... *G01M 9/04* (2013.01); *G06F 13/4027* (2013.01); *G06F 16/252* (2019.01)

(58) Field of Classification Search
CPC ..... G01M 9/04; G06F 13/4027; G06F 16/252
See application file for complete search history.

(56) References Cited

U.S. PATENT DOCUMENTS

| | | | |
|---|---|---|---|
| 7,987,707 B2 * | 8/2011 | Milde | G01M 9/06 73/147 |
| 9,766,153 B2 | 9/2017 | Magee | |
| 10,267,708 B2 | 4/2019 | Skube | |
| 2008/0004838 A1 * | 1/2008 | Yungkurth | G06Q 10/04 702/182 |
| 2011/0235672 A1 * | 9/2011 | Shepard | G01J 5/0014 374/45 |
| 2014/0303907 A1 | 10/2014 | Roughen | |
| 2021/0308396 A1 * | 10/2021 | Downs, III | A61M 16/0891 |

* cited by examiner

*Primary Examiner* — Francis C Gray
(74) *Attorney, Agent, or Firm* — AFMCLO/JAZ; Larry L. Huston

(57) ABSTRACT

An instrumented wind tunnel. The wind tunnel receives a test subject which can be a model of an object to be tested with dynamic airflow. The test subject is fitted with at least one sensor to deliver data to a chassis, which in turn uses a network having at least 10 Gb/s capability to deliver the data to a RAM cache. The RAM cache can push the data to multiple viewers for real time monitoring of wind tunnel tests. The operator can then make live adjustments of the test conditions.

19 Claims, 11 Drawing Sheets

WIND TUNNEL HAVING LOW LATENCY DATA PUBLISHING

STATEMENT OF GOVERNMENT INTEREST

The invention described and claimed herein may be manufactured and used by or for the Government of the United States of America for all government purposes without the payment of any royalty.

FIELD OF THE INVENTION

The present invention is directed to monitoring and data collection of wind tunnel experiments and more particularly to low latency, high-speed data collection and display during wind tunnel experiments.

BACKGROUND OF THE INVENTION

Wind tunnels have been used for several decades to study the effects of moving air on objects such as aircraft, missiles, automobiles and buildings. A typical wind tunnel has an air intake, a test stage where an object under consideration, or a model thereof, is staged, collectively referred to herein as a test subject, and an exhaust. The exhaust is in fluid communication with the test stage and the inlet, to evacuate air that passes the test subject. The air may be recycled through the wind tunnel in a closed loop from the exhaust back to the inlet or may be replenished at the inlet.

The air moves relative to the test subject so that determinations and predictions can be made about the lift, structural response and drag performance of the test subject. For example, if the test subject is a wing of an aircraft, measurements as to air speed, direction and pressure may be desired as the wing is exposed to the airflow at different angles. The test subject may be studied in a static position under steady state air flow, dynamic conditions as the test subject is moved through pitch, roll and yaw sequences, dynamic conditions as air speed and air pressure are varied or combinations thereof.

Test data may be collected through particle image velocity (PIV) measurements, laser Doppler velocimetry, etc. But often analytical data are insufficient to complete the study. For example, data collection from the sensors may be too slow to capture critical data points and the raw numbers may not provide a full picture of the test results. Similarly, collected data may be too coarse, missing key data points.

Typical data collection occurs at a sampling rate of about 10 kHz to about 20 kHz. But such rates may compress significant data or even miss entire phenomena of interest, leading to adverse consequences. If the test subject is an aircraft, adverse consequences can be severe. For example, a spike in air pressure during a maneuver could make the aircraft unstable or even stall an engine.

But current state of the art computer data gathering systems do not have the speed or resolution to increase sampling rates to the desired resolution. Fast Fourier Transform analysis feeds a single channel and cannot provide the desired sampling rate. External drives cannot communicate fast enough to determine certain disruptions during testing, thereby minimizing the opportunities to make dynamic changes during the test for correction or deeper study. Furthermore, plural phenomena may be merged and disguised as a single event or may be missed altogether. Attempts to dock data to RAM have resulted in missed data points then publishing those data to a network have resulted in missed data points, as have data reduction and summarization techniques. Without accurate test data, subsequent developments based thereupon may not be optimum.

Current wind tunnel data collection systems do not have a data store which provides real time, i.e. less than 10 ms, access of that data to processing machine attached through a network. Similarly, current systems do not provide enough time history of the data to fully analyze all phenomena of interest. For example, KAFKA software is believed to have excessive latency, and require at least five or more machines to even begin a single test run. Even so, it is believed the latency would be unsatisfactory. File based storage has been found to require too much disk access time and too much buffering to be feasible. Reflective memory hardware is believed to be buffer limited to slower transfer rates and requires custom software for each application. The MQTT protocol does not have sufficient storage for the necessary data. The Memcached data store is difficult to use with the necessary software and does not support the desired data structures. The KDB+ database is directed to finance applications and has unknown server interactions. The present invention overcomes these disadvantages.

SUMMARY

In one embodiment the invention comprises and instrumented wind tunnel for testing a test subject. The wind tunnel comprises an inlet, a test stage for receiving a test subject therein, and an exhaust, all in mutual fluid communication. The wind tunnel further comprises an instrumentation system. The instrumentation system has at least 10 sensors for attachment to a test subject. The sensors report data to an IMNC. The IMNC. In turn is in communication with at least one viewer via a network having a transmission rate of at least 10 Gb/s.

DETAILED DESCRIPTION OF THE INVENTION

Figure 1:
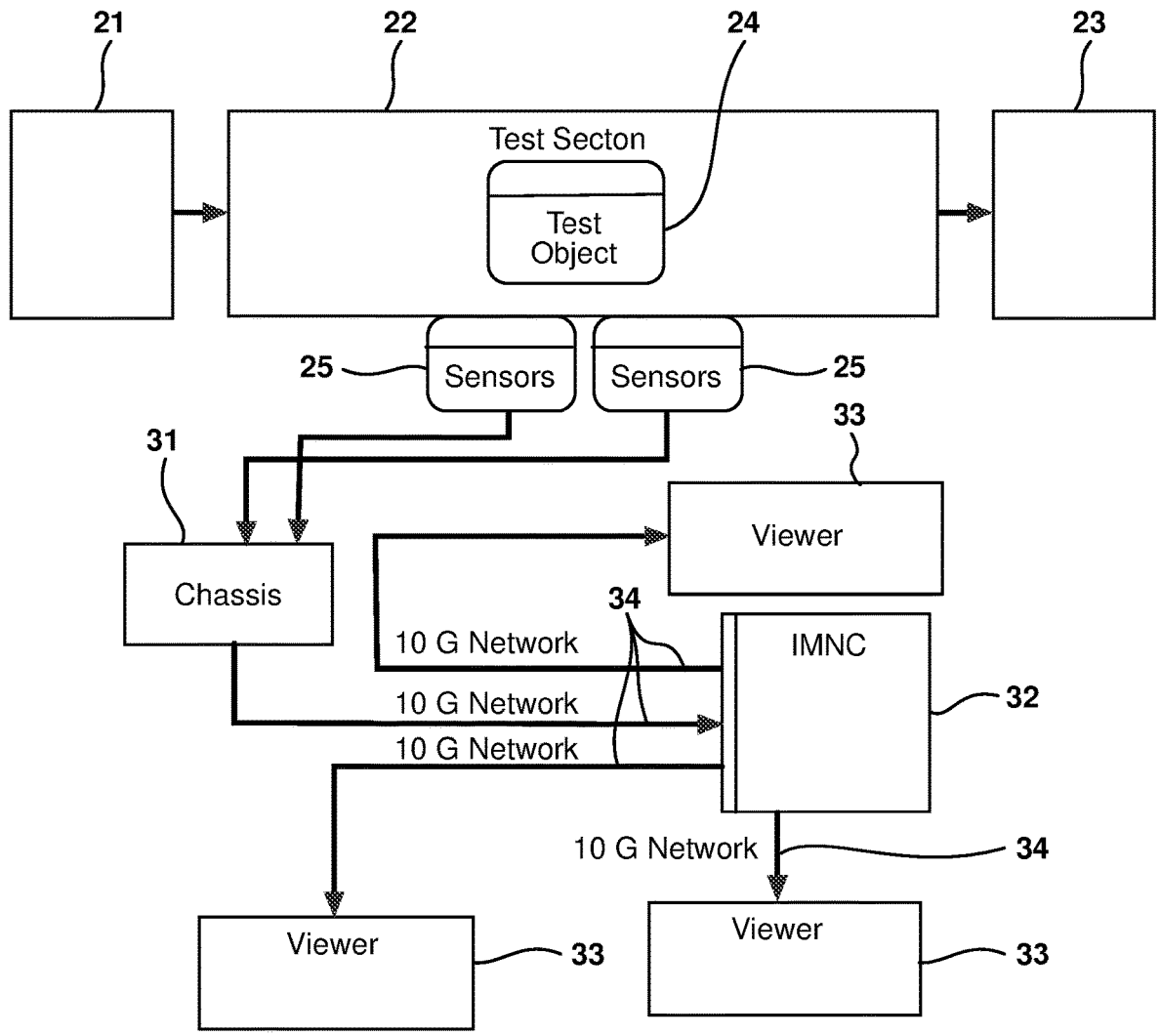
FIG. 1 is a schematic view of a wind tunnel and a block diagram of an exemplary instrumentation system according to the present invention.

The following terms are used as set forth below and include all equivalents thereof.

Data Library—an in-memory data structure store, used as a distributed, in-memory key-value database, cache, and message broker, with optional durability. The data library may support different kinds of abstract data structure store such as strings, hashes, lists, maps, sets, sorted sets, time logs, bitmaps, streams, and spatial indexes. The data library may be configured to perform replication, Lua scripting, LRU eviction, transaction, and different levels of on-disk persistence, and automatic partitioning. Exemplary, nonlimiting data library in-memory data structure stores which may be used to create data libraries include: an in-memory data structure store, used as a database, including database management operation, cache, and message broker such as Redis, available from Redis Labs; an in-memory datastore such as Memurai available from Janea Systems, Inc.; a Java-based in-memory grid to network computers, such as Hazelcast available from Hazelcast, Inc.; a NoSQL database program, such as MongoDB which uses JSON-like documents with optional schema, available from MongoDB, Inc.; a distributed event software bus stream-processing platform such as Kafka, available from the Apache Software Foundation; and a general-purpose distributed memory object caching system, such as Memcached, available from Memcached.

In-Memory Networked Cache (IMNC) is a key value Nosql type datastore RAM memory cache.

Instrumentation Chassis—includes instruments, data acquisition devices, smart sensors, and any of various types of devices that are operable to acquire and/or store data. An instrumentation chassis may also optionally be further operable to analyze or process the acquired or stored data. Instrumentation chassis may be executed as a traditional stand-alone "box" instrument, a computer-based instrument (instrument on a card), a data acquisition card, a device external to a computer that operates similarly to a data acquisition card, a smart sensor, DAQ measurement cards/modules, an image acquisition device, such as a machine vision card/video capture board/smart camera, a motion control device, etc. Exemplary "stand-alone" instruments include oscilloscopes, multimeters, signal analyzers, waveform generators, spectroscopes, and similar instruments. An instrumentation chassis may be further configured to perform control functions, e.g., in response to analysis of the acquired or stored data. For example, the instrumentation chassis may send a control signal to an external system, such as a motion control system or to a sensor, in response to newly acquired or stored data. An instrumentation chassis may also be configured to perform automation functions, i.e., may receive and analyze data, and issue automation control signals in response.

Program—may be embodied as 1) a software program which may be storable in a memory and executable by a processor and 2) a hardware configuration program useable for configuring a programmable hardware element.

Push-pull—the capability to post from one machine to another while reading data from other machines (which may or may not be the machine posted to) without affecting the post operation data, and is interchangeably referred to as push-pull or push-pull isolation.

Sharding—the splitting and storing a single logical dataset into a plurality of databases. Distributing data among a plurality of databases allows the databases to store, handle and access larger datasets than can be done with a single database.

Software Program—includes any type of program instructions, code, script and/or data, or combinations thereof that may be stored in a memory medium and executed by a processor. Exemplary software programs include programs written in text-based programming languages, such as C, C++, C#, JAVA, Matlab, Python, Ruby, Julia, R, Scala, etc. Software programs include streaming platforms and caching systems such as Apache Kafka and Memcache, respectively. Software programs also include graphical programs, programs compiled to machine language, scripts, and other types of executable software. A single software program may comprise two or more interoperable software programs. A software program may be stored as program instructions on any known memory medium.

Value—arbitrary byte arrays.

Viewer—a program comprising a plurality of interconnected nodes or icons, which visually indicate functionality, state of the program or other data. The interconnected nodes or icons are graphical source code for the program. The nodes in a viewer application may be connected in one or more of a data flow, control flow, and/or execution flow format. The nodes may also be connected in a signal flow format, which is a subset of data flow. Exemplary viewer applications development environments which may be used to create viewer applications include LabVIEW® from National Instruments, DasyLab™ from National Instruments, DIAdem™ from National Instruments, Simulink® from MathWorks, MATLab from MathWorks, SoftWIRE™ from Measurement Computing, Khoros™ from Khoral Research and SnapMaster™ from HEM Data.

Viewer Machine—a machine capable of displaying test data to an operator.

Referring to FIG. 1, the present invention comprises two main components, a wind tunnel 20 which generates data and an instrumentation system for receiving and storing the data. An exemplary wind tunnel 20 comprises, in order, an air source (not shown), an inlet 21 for directing air to a test stage 22, and an exhaust 23 for evacuating air from the test stage 22. The inlet 21, test stage 22 and exhaust 23 are in mutual fluid communication. One or more test subjects 24 may be disposed in the test stage 22 for experimentation and data generation.

Aerodynamicists often use wind tunnels 20 for test subjects 24 such as models of proposed aircraft and engine components. During a test, the test subject 24 is disposed in the test stage 22 of the wind tunnel 20 and air is made to flow past the test subject 24. Various types of instrumentation are used to determine the forces on and interactions with the test subject 24.

During testing, aerodynamic forces, moments, pressures, velocities, etc. on the test subject 24 may be directly measured from a plurality of sensors. While two sensors 25 are shown in a nonlimiting illustration, one of skill will recognize the plurality of sensors 25 may number in the tens and hundreds of sensors 25 for any particular test. For such a test, the test subject 24 may be disposed within the test stage 22 on a force balance. The force balance generates output data indicating the lift and drag forces/moments on the test subject 24 during specific test conditions. These force measurements may require data reduction and/or post-processing to account for Reynolds number and Mach number effects.

The sensors 25 on the test subject 24 may measure and collect the desired data. A typical wind tunnel 20 test will have at least 10 sensors 25, likely 32 sensors 25, more likely at least 50 sensors 25, at least 100 sensors 25 or at least 200 sensors 25 for a particular test.

More particularly, the test subject 24 may be instrumented to provide diagnostic data for the flow of air around the test subject 24. Diagnostic instrumentation includes static pressure taps, total pressure rakes, laser Doppler velocimetry, hot-wire velocity probes, etc. The collected data may include steady state flow data, unsteady flow data, time-varying data, etc. Except as may be specifically claimed herein, the air source, instrumentation, wind tunnel 20 and test subject 24 form no part of the present invention.

With continuing reference to FIG. 1 an exemplary hardware configuration for the instrumentation system of the present invention is shown. Data from the sensors 25 are fed to a chassis 31. The chassis 31 can be real or simulated as discussed below. The chassis 31 is in communication with an in memory network cache (IMNC 32), as discussed below. The IMNC 32 is in communication with one or more viewers 33. The viewers 33 allow the operator to see the data in real time and adjust test conditions in real time.

Examining the instrumentation system of the wind tunnel 20 in more detail, an instrumentation chassis 31 subsystem optionally containing cards for allowing sensors 25 to measure data at sampling rates of at least 50 kHz, 60 kHz, 70 kHz, 80 kHz, 90 kHz, 100 kHz, 150 KhZ and 200 kHz is shown. The sampling rates may be mutually different.

These data may be recorded to one or more tdms files and live streamed to a data library machine. The instrumentation system of the present invention can publish data received from the sensors 25 to a data store for later processing. The data stored on the library machine can be accessed by a viewing machine at virtually the same time as the instrumentation chassis 31 is posting new data. The present invention provides for data to be collected at sampling rates of at least 200 kHz for durations of at least 50 ms, 60 ms, 70 ms, 80 ms, 90 ms, 100 ms, 200 ms, 300 ms, 400 ms or 500 ms. This hardware configuration may be operated with 1, 2, 3, 4 or any suitable number of viewer machines 33, with each viewer machine 33 simultaneously accessing the data store. Push of the data to the library machine is not adversely affected by such simultaneous access. Viewers 33 successfully ran with 10 Gb/s interfaces on following machines: Dell Precision 7540 with i9, and 96 GB RAM; Dell Precision 5520 with i7 and 32 GB of RAM and Apple MacBook Pro with i7 and 16 GB of RAM, showing the versatility of the invention.

Such a system can acquire and access a history of instrumentation data provided by the interfacing instrumentation library software and hardware. These data are available for real time monitoring and processing, without adversely impacting the data acquisition computer or operational functioning of the computer system. Data sampling rates on the order of at least 50 kHz, 60 kHz, 70 kHz, 80 kHz, 90 kHz, 100 kHz, 150 KHz and 200 KHz can be captured and live streamed without adverse data loss. The system of the present invention may utilize push-pull isolation with a different server than is used for the data acquisition. Live data history may span at least 3 seconds, 4 seconds or 5 seconds as required for individual tests and may be expanded for longer durations with multiple computer library systems if necessary.

The preferable use of open source data library as a living history data storage allows generality of data access through the instrumentation library and hardware while maintaining control of that data. Data rates suitable for wind tunnel 20 testing can be maintained without information loss due to the isolation of the system push-pull operations. The system has the adaptability to handle larger data sets if more computers, cores, or program instances are utilized.

The present invention provides predetermined data in the memory to be moved to a fast IMNC 32. The IMNC 32 can reside on separate machines which are independent of the data gathering machine. This configuration enables hardware with sufficiently accessible memory and cores and network 34 speeds of at least 10 Gb/s.

The software may use strings encoded in Json format for up to 64 Kb of string lengths, and may use binary for greater than strings greater than 64 Kb. Within 10 ms, 8 ms, 6 ms or less, the processing software on a different machine could access and process the data and return the result to the TDAS software or other data stores.

Monitoring and control software, such as MOSAIC by MNC software, can support capture of a long-time period of living history of test data and make the data accessible to processing codes. This living history can be large as large as helpful and only limited by the size of the IMNC 32 memory, thereby allowing the processing software to select the time window of interest.

In one embodiment, the software preferably accommodates a native data rate of 20 Hz of the TDAS software and a data channel count of 300 data values. Preferably the software supports a data rate of at least 100 kHz, 150 kHz or at least 200 kHz data rate for up to 8 channels, 16 channels or 32 channels. The inventors have found that the present system provided data transfer from a real time chassis 31 posting every 100 ms to a queue end point without affecting other real time system critical tasks.

Preferably, the processing software can retrieve data from the IMNC 32 data store on command without adversely affecting the real time system's posting to the queue. This process is called push-pull isolation. This arrangement allows other systems to access the data at the same time it was being posted to the real time system. This pull-push isolation allows systems performing critical time functions to also write to the data store, so that other hardware and software can act upon that information. It has been demonstrated that data can enter at a 100-millisecond rate, while pulling 1.0 second of data with no observable effect on the real time system. Prophetically, it is believed that use of multiple master data store instances of the IMNC 32 with push-pull isolation would further improve these data sizes. A software value posted data to IMNC 32 at a 200 kHz sample rate for 32 channels has been found to be maintainable for a 2 minute living history of data, using only 8 GB of RAM. The time duration of the living history can be expanded by increasing RAM on the IMNC 32 and/or by implementing horizontal scaling using multiple IMNC 32 machines. A HP Z820 machine with 32 hyperthreaded cores and 128 GB of ECC RAM with an Intel X710-T4 Ethernet 31 converged network 34 adapter has been found suitable for an IMNC 32 in both switched and unswitched testing.

The IMNC 32 storage volume is limited by the installed memory of the IMNC 32. To increase the total storage size, multiple machines may be used in parallel to separate the data into channels, with each channel representing a source sensor 25. In such an embodiment, the system can send different channels of data to different IMNC 32 machines. This arrangement can provide significant increase in storage duration and size. This arrangement also reduces load on network 34 and processors, for improved push-pull isolation. In another embodiment, one could use multiple instances of the data store on one machine in combination with multiple network 34 cards on that same machine to gain parallel or horizontal scaling/sharding improvements.

The real time software may use internal memory queues as a separate process to handle IMNC 32 interactions and to sanction isolation of the internal processes. The real time isolated process preferably does not adversely affect other processes on the machine through the IMNC 32 interactions.

The viewer software is decoupled from the real time software while permitting the viewer machine 33 to access detailed information from the real time system and associated living history. The viewer machine 33 observes a plurality of measured signals while computing a respective power spectrum distribution (PSD) and may be performed on multiple machines. Implementation of such a viewer machine 33 function may use 10 Gb/s copper interfaces and a quad 10 Gb/s card on an IMNC 32 machine. Direct connections, without switches, to each machine interacting with the high-speed data may be used to improve network 34 reliability.

Network 34 retransmissions, can create an unacceptable 200-millisecond data dropout. Such a data dropout is generally considered unacceptable and is believed to be avoidable by using a suitable 10 Gb/s switch. A Netgear model XS708ev2 has been found suitable. It has been found that the use of such a 10 Gb/s switch provides excellent error performance, when used with high quality cabling and 10 Gb/s network 34 cards, with INTEL cards being preferred. Testing demonstrated such a system successfully provides four different machines access to the IMNC 32 data, while simultaneously running the viewer application at the same time. No noticeable effects on the pushing applications were observed in a single master only server arrangement. This system architecture allowed a simulation software to be coded to simulate the real time system for posting to the IMNC 32.

In another embodiment, a switchless system can be used to reduce latency between machines per transaction. A switchless system has hardwires connecting the machines port-to-port. This embodiment may further require particular network 34 cards, such as serial network 34 cards, for optimum operation, complicating the networking. But this embodiment provides the benefit of reduced latency compared to the previous embodiment.

In either embodiment one of skill may seek to minimize the number of commands to the IMNC 32 using a lightweight embeddable scripting language, such as Lua available from LabLua. By way of non-limiting example, Redis/Memurai can issue Lua scripts to send data and program information in a single network 34 submission. This process can provide significant reduction in round trip network 34 transaction time and was found to provide significant improvements in data volume and latency.

Push-pull isolation can be further improved by using multiple master configurations in the IMNC 32 server to push data into different master data stores and pull-out pluralities of data ranging from seconds to hours from the master data stores. A suitable configuration is a cluster of master instances either on one machine or on separate virtual or physical machines. Such an arrangement could use one master root 42 instance to hold data that is used by the cluster for system management and multiple submasters 41, to hold the channel data. It would be feasible to have as many submasters 41 as have channels of data or that channel's respective sensor 25. The submasters 41 can be controlled by a Root master, which has topographical data, but no raw data.

Preferably this system has the same number of submaster 41 data store instances and channels. A system with 32 channels and 32 master data store instances on one machine with 32 hyperthreaded cores and 128 Gb of ram has been found suitable. Alternatively, one may have a separate physical machine for each of the channels. This alternative arrangement is prophetically expected to improve both horizontal scaling and push-pull isolation.

It has been found that implementing a real time view of the data as a condensed one screen dashboard enabled the operator to make key decisions during a wind tunnel 20 test. Accordingly, and the real time view need not be included in critical path data of recorded files to the customer of the data. Prophetically one could implement a loss-less transfer of data from the real time system to the IMNC 32 and then to another machine on the network 34. This arrangement uses two or more IMNC 32 servers, each having multiple master instances for each server.

This configuration has been implemented in a test program with 32 separate channels going to 32 different IMNC 32 server instances on one machine. Data volume was found to increase by a factor of 10 compared to a single IMNC 32 server used as a control. It would be expected that 32 separate physical machines in a cluster would measure substantial improvement in sample rate with a very low error rate and excellent push/pull isolation.

Figure 2:
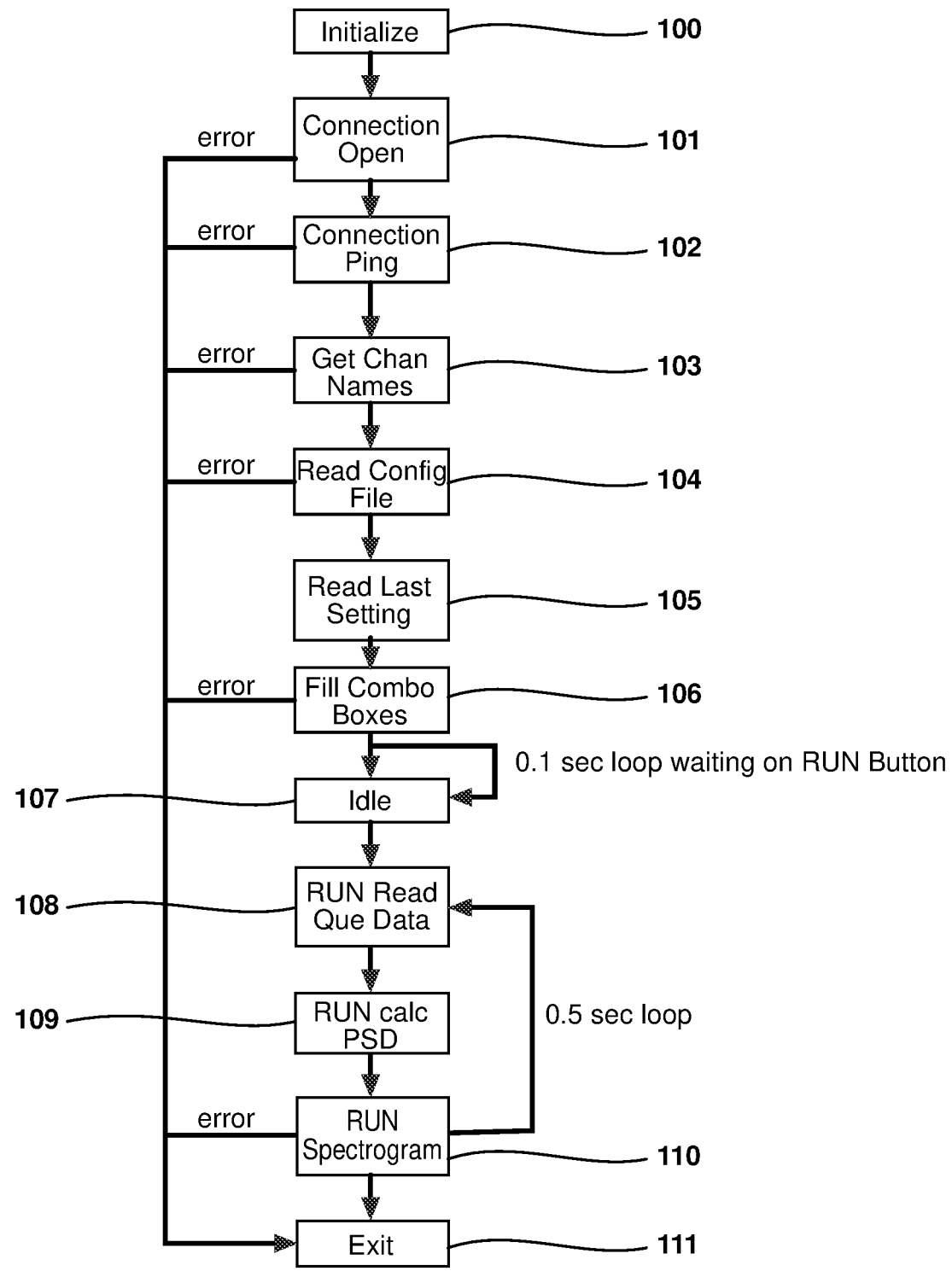
FIG. 2 is a block diagram of an exemplary control loop for reading the data queue on the library machine
Figure 3:
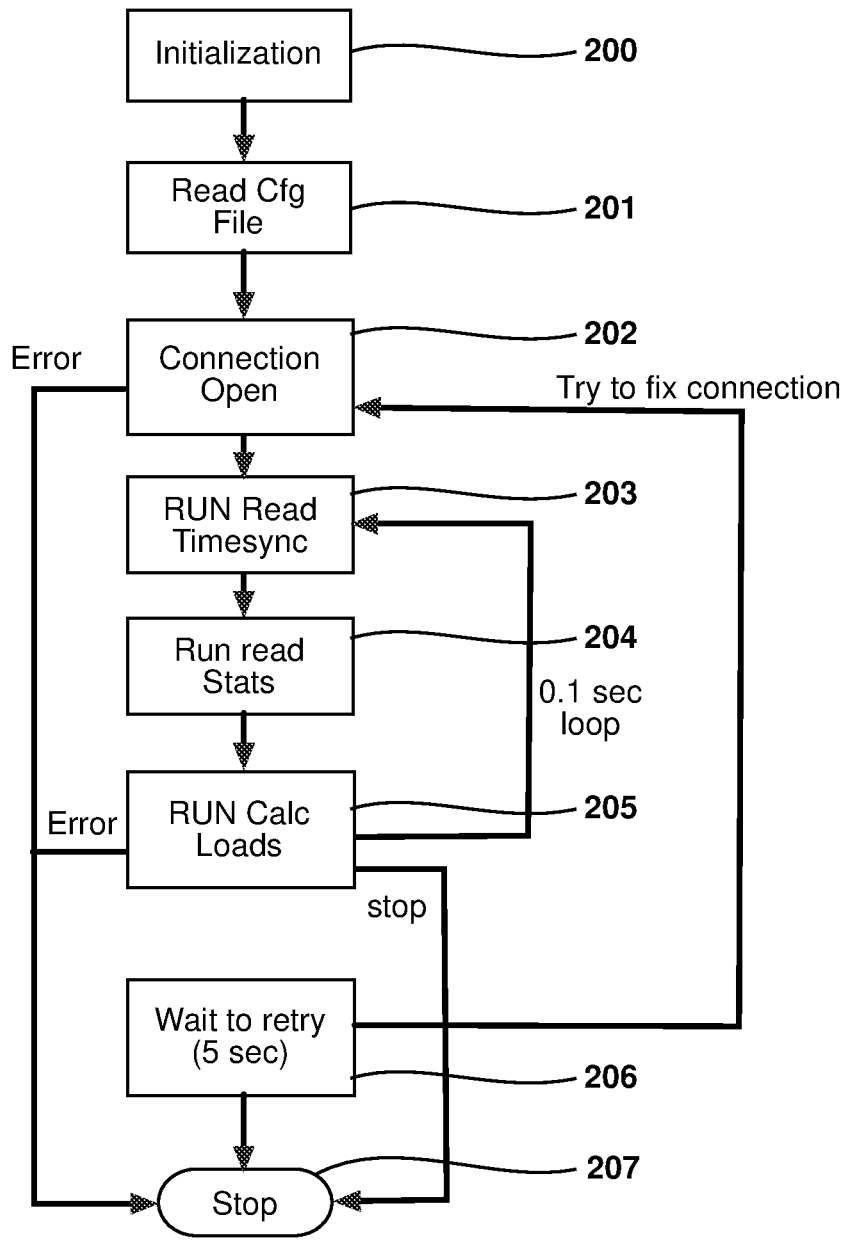
FIG. 3 is a block diagram of an exemplary control loop for reading a variable string value generated by a system instrumentation chassis.

Referring to FIGS. 2-3, an exemplary viewer application according to the present invention is shown. This application has two processing loops which separately access the data store. Loop 1 is shown in FIG. 2. Loop 1 reads the data queue on the library machine and pulls out, for example, 500 ms of data every 500 ms for 8 of the 32 channels. The user can select any 8 of the 32 channels as desired and the data can be pulled from the library machine, calculated and displayed, for example, as a power spectrum distribution (PSD) to screen.

Specifically referring to FIG. 2, the program initializes 100 when the program is started waiting for command as the program is a state machine that checks progress to move from given states based on commands or scenarios. The connection to the Ethernet 31 is opened 101 and then checks to verify the connection is functional and sets up to error and self-heal if necessary in 102 the program can enter an error at the various nodes throughout the full program for the initialization of this viewer program. If all is well with the connection it moves into 103 where the program will grab the data array of the channel names and then read in the .ini file 104 to know the basics of the system. The last setting of the viewer machine 33 from when it was last opened is recorded to file and is then read 105 into the viewer machine 33 as a starting place for the data stream tags to be visible and ready to be set by the user. The viewer machine 33 data feeds are filled with this information from the data store 106 and are set into a wait loop 107 for the feed displays to be updated with a command from the user to start live viewing. Once the live feed is initiated by user 108 the program reads the data and performs the requested calculations 109 a PSD in this instance. A secondary program also initiates 110 to perform a spectrogram of displaying the frequency data in a time history view. These calculation display processes run until the user commands the program to disengage 111.

The second loop is shown in FIG. 3, this process reads a variable (string value) that is generated by the instrumentation chassis 31 every 100 ms. This variable may calculate key performance indicators (KPI) such as, and without limitation, mean, median, standard deviation, RMS, variance, mode, minimum and maximum values for all measurements taken during the 100 ms window. A rough frequency count could also be measured.

Such KPIs are calculated in real time on the measurement device and must be able to be calculated at low computational load as not to affect the overall process. If more complex calculations (that are not possible with the CPU on the measurements computer) are deemed useful then a FPGA hardware could prophetically be used to improve the calculation speed to obtain such measurements.

Once these measurements are complete, a Json string is suitable for encoding and posting to the datastore in a queue of substantial length. This information can also be posted to a second queue usable to transfer the measurements to a database (DB) such as SQL or NoSQL. Transfer time from when measurements are taken until searchable is preferably less than 100 ms, 80 ms, 60 ms or 50 ms.

Another desirable option is to post the data KPI's to the IMNC 32 in root master in real time unexpectedly allowing for finding events from KPI's in less than 5 ms. Such data are not stored in a separate database or NoSQL database, to allow answering queries of whether a KPI happened, how often, and when in time. The operator could then pull up the raw data for future processing. It is envisioned that if KPI's are correctly selected, that 90% of queries/questions would be answerable from KPI's and unexpectedly not require pulling raw data for further processing.

In another embodiment, storing data to an external SQL or NoSQL database is feasible, but may also require evaluation of its query time to return results. Advantageously, storing KPI's into the IMNC 32 root master provides the benefit that a ZSET data structure can perform fast searches.

Data in this DB are searchable and the machine can search through all the data packets for the key measurements with logical "AND" or "OR" between multiple measurements on one channel or across plural channels. Unexpectedly, this configuration fundamentally changes the power of the datastore to efficiently find specific events with minimal computational costs. The database could be searched to determine whether a specific issue occurred without affecting the load on the data store at all. Once the search is complete, then a specific data packet ID can be efficiently retrieved. Such efficiency allows search and retrieval to occur simultaneously, while data are being posted to system and improve the overall computational load on the data store.

With continuing reference to FIG. 3, the viewer program has a secondary set of calculations that are performed at a different rate. The process of FIG. 2 operates on a 500 ms clock rate while the calculations of the viewer machine 33 in FIG. 3 advantageously operate on a 0.1 s clock rate. The program opens upon user command 200 and reads in the array files names from the ini file 201. The connection to the Ethernet 31 socket 202 is verified to communicate with the data store. A time alignment verification check is performed 203 to ensure data consistency between the various systems and is reported to the user. The calculations of the statistics performed on the chassis 31 in real time are read and reported 204 and calculations on the load signals, specified channels of interest, have matrix math performed on the channels, and are reported on a 0.1 s update cycle 205. If there is an error in the connection the program errors out and waits to retry the connection in a self-healing sequence to reestablish the connection 206. The program will then close upon user initiation 207.

Figure 4:
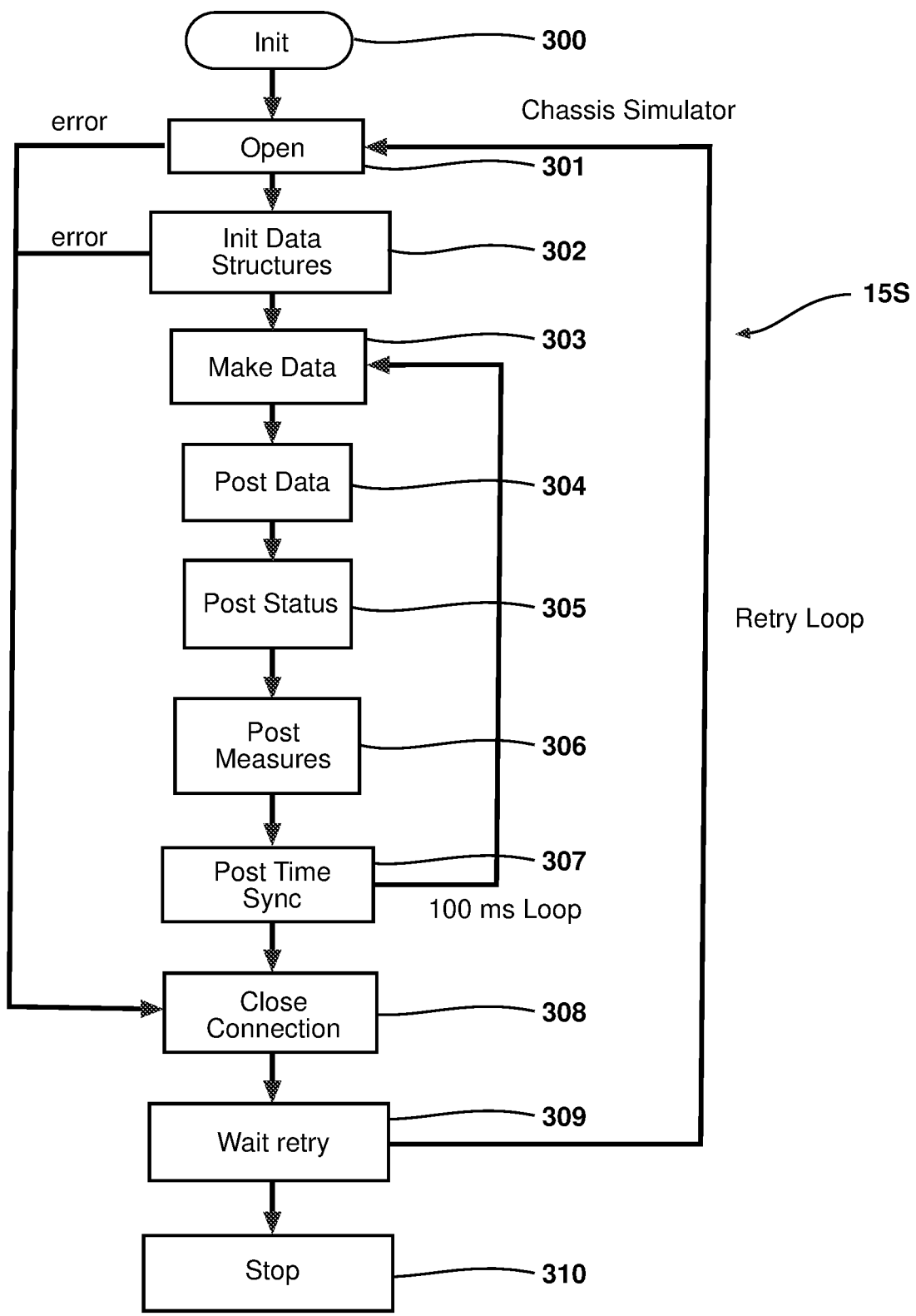
FIG. 4 is a block diagram of an exemplary control loop for reading a simulation data generator of a NI PXIe Chassis.

Referring to FIG. 4, this process may run on a 100 ms loop rate or faster, and perform matrix math on the KPIs and then display the data on plural charts to report the running history of the resulting test loads, moments and other data resulting from this matrix math. Particularly, this program is a chassis 31 simulator that may be used for development of code instead of the instrumentation and data chassis 31 for code development. The program initiated by the use 300 and open connection to data library 301 and enters a state to set up the data store for the correct channel data structures with initialization data to start the structures necessary for run status 302. The simulated signal structures are then created upon user-chosen command 303 of the type of wave structures desired to feed the channels and coded into a data packet for however many desired channels are to be tested. The channel information is posted to the data store by serialization of the data 304. The status of the data is checked 305 and posted to a viewer for error checking to the designer to allow troubleshooting purposes. These statistics are supplied 306 to the master root 42. The time synchronization is verified 307 and will loop if all is well with the system and keep supplying the simulated data assigned by the user. If error is detected in connection, the program will close connection 308 and then retry connection 309. The program is closed upon user command 310.

A simulation data generator has been made using a simulation of a NI PXIe chassis 31. This application unexpectedly and efficiently provided refinement of the viewer machine 33 and overall system without a PXIe chassis 31. Such simulation also allows for testing and verification of the posting and pulling software which is believed to be infeasible with a NI PXI chassis 31, The use of an external system to hold the library of data, allows uncoupling of the data generating application from the data pulling application. Data was posted to IMNC 32 from A Dell Precision 7540 with 19 processor, and 96 GB, has been found suitable for data to the IMNC 32 when simulating the PXIe chassis 31.

The wind tunnel 20 having the data library of the present invention has been found to work well, providing detailed displays of the key high-speed sensor 25s with a living history. It has found 32 channels with a sample rate of 200 kHz is the current limitation for processing in 100 ms on the instrumentation chassis 31 while maintaining a timing margin with a 1 Gb Ethernet 31 interface.

Figure 5:
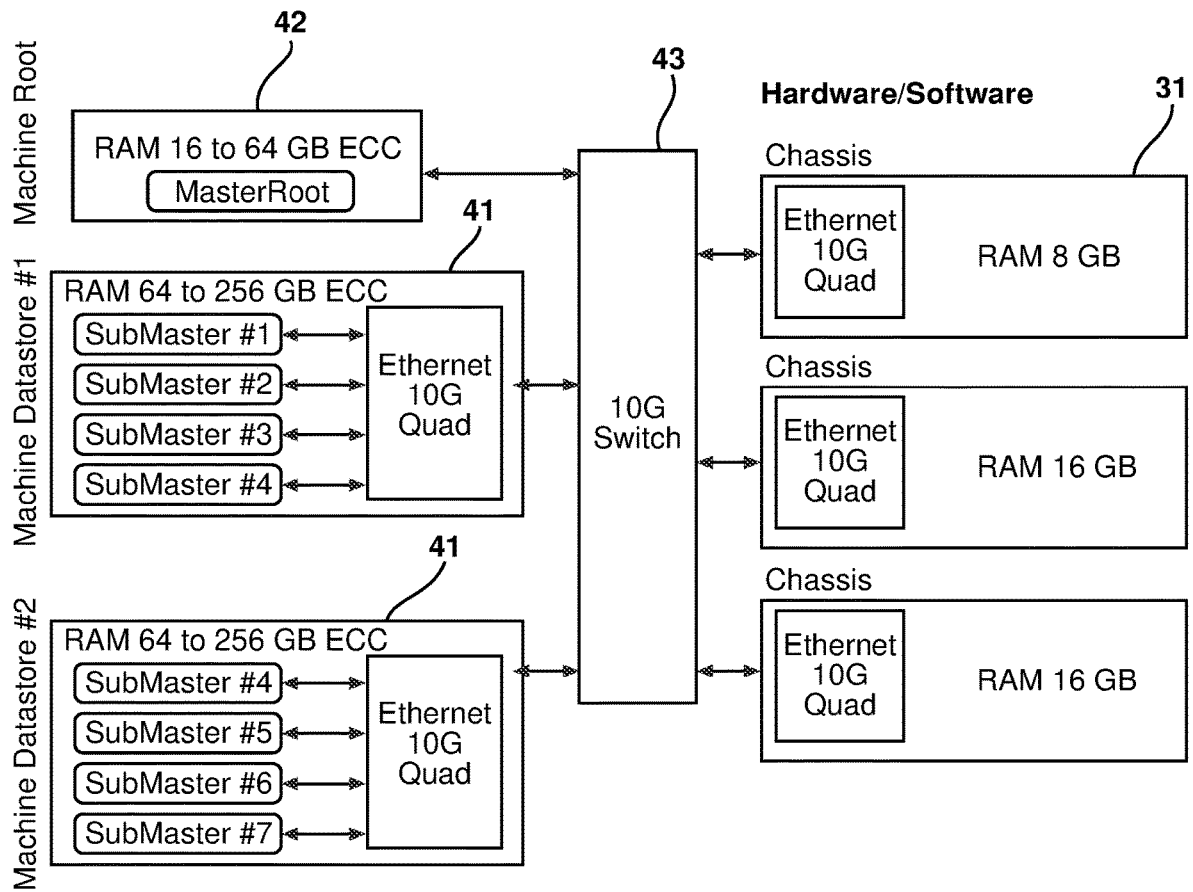
FIG. 5 is a block diagram of an exemplary hardware/software configuration of an alternative embodiment.
Figure 6:
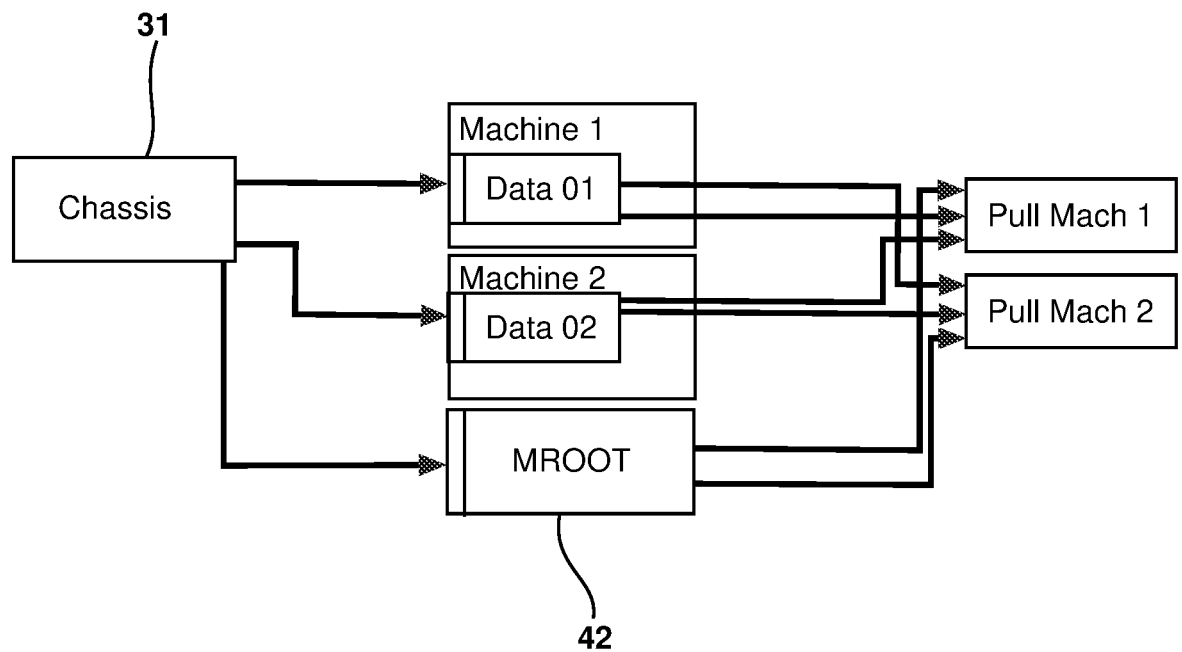
FIG. 6 is a block diagram of an exemplary hardware configuration for a data generator/push machine using a queue distribution of data.

Referring to FIGS. 5-6 an alternative system has multiple physical machines with each of these machines having multiple instances of the data store software. The number of machines can be increased to more than the two illustrated in non-limiting fashion, to support even higher throughput.

The data store of the system can be horizontally scaled through use of multiple data store instances; where these instances are grouped/shared on physical machines or on different physical machines to accomplish the specific channel count or sample rate desired.

This horizontal scaling to multiple machines would prophetically improve data store storage size up to 80% of the configurable RAM, as well as reduce the CPU load on data store machine. This configuration would result in favorable push-pull isolation so that a significant history on the order of the last 30 s, 60 s, 90 s, 120 s, 5 min., 15 min., 30 min., 45 min., 1 hr., 2 hrs, 3 hrs., 6 hrs. or 9 hrs. of time being maintained and pulled at high frequency without the push operation being affected is achievable.

Referring specifically to FIG. 5, the real time chassis 31 may post all of the data for one-nth of the channels to each master instance on n corresponding individual machines in parallel and at the same time. Two machines are shown in this nonlimiting example with the real time chassis 31 posting about half of the data to each machine.

This configuration provides the benefit that sharding the data allocates a smaller data set to each of the plural machines by the channels, so that the sample rate and number of channels can be increased over using a single database. Each physical machine may have a dedicated master instance to horizontally scale the data volume and post speeds.

Configuration of the IMNC 32 Server may include limiting installed software and processes, turning off the antivirus, setup of IMNC 32 software so that it does not have any persistence such as requiring the controlling application to save data to disk only when necessary, limiting the overall Memory used by IMNC 32, reducing minimum memory swapping to disk and setting all network 34 interfaces to use jumbo frames. Quad port 10 Gb/s Intel X710-T4 network 34 cards with have been found suitable with network 34 interfaces of 10 Gb/s and would prophetically improve by using a network 34 interface of 20 Gb/s, 30 Gb/s or preferably 40 Gb/s.

Figure 7:
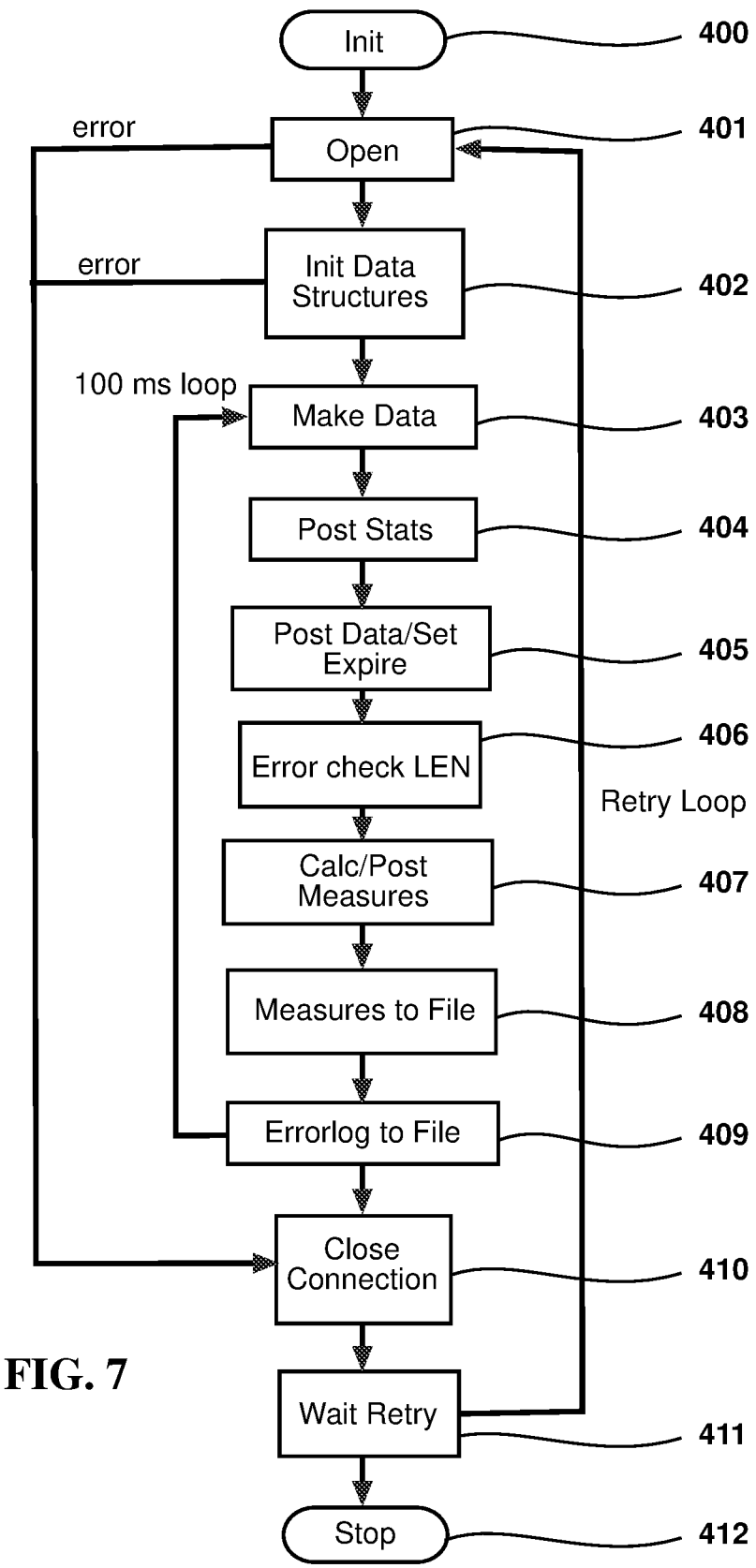
FIG. 7 is a block diagram of an exemplary control loop for a cloned software Posting Process flowchart showing the separation of data into 32 submasters.
Figure 8:
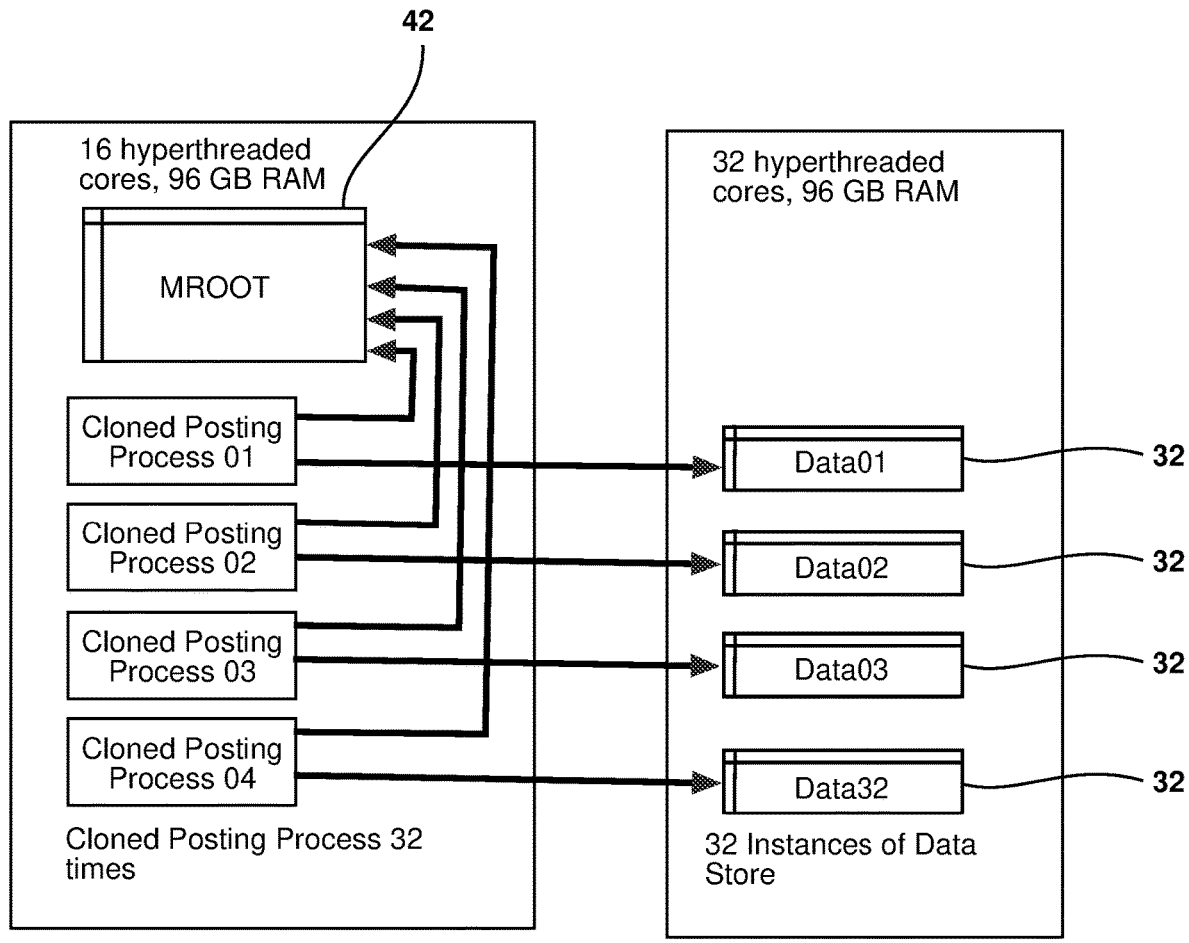
FIG. 8 is an exemplary block diagram of hardware for separating data into 32 submasters.

Referring to FIGS. 7-8 data may be measured on one system and pushed to the IMNC 32. In such a system a plurality of virtual or physical machines may read the data and then post back to IMNC 32 or other data store for recording. Such a system may be limited by the processing code, such as used for wind tunnel 20 balance data reduction, which is limited to about 10 Hz. Prophetically one can improve calculation rate by posting data from data taking machine into a queue in the IMNC 32 then read the data from this queue into 64 machines. The queue is then read by the 10 Hz processing code. This architecture provides the benefit that having 64 machines running in parallel, allows each machine to process a single dedicated value. This architecture has been found to successfully increase overall processing speed more than an order of magnitude from 10 Hz to 500 Hz, and improve machine operation accordingly.

The IMNC 32 may be used to process data from critical real time systems so that sparse data are removed, and the remaining data are more compressed. And particularly compressed by using dynamic sample rate compression. This process may be locally performed, then the compressed data posted to the Cloud for further processing. The IMNC 32 could be used to store data from high-speed sensors 25, and also measure multiple cameras using at least 10 Gb/s Ethernet 31 interfaces on same machine. This configuration is believed to advantageously allow fast access to both the sensor 25 data and camera feeds with sufficient processing power.

The use of the IMNC 32 as the key data publisher and communication component of this system unexpectedly allows relatively low cost devices to be used. For example. a single-board microcontroller, such as Model Due with an integrated network 34 available from Arduino and Model 4 single board computers, available from Raspberry Pi Foundation have been found suitable.

The client software will need access to the IMNC 32 server for the improved operation described herein. For example, Linux and Windows OS devices will work with the architecture described herein. State-of art programming languages such as Python, R and preferably Julia are suitable and have packages/libraries to enable machine learning, AI and deep learning. Manipulation of the data structure with sufficient supporting high channel count/high-speed data transfer of at least 200 KHz and real time operation is preferred.

Referring specifically to FIG. 7, a thread isolation process usable for error checking up to 32 processes which were used to verify suitability with available channels to be read during a test. This program is initialized upon user command 400 and enters an open state to initialize the program connection ports to the Ethernet 31 connection 401. The data structures are initialized 402 for different instances of the data store to present thread isolation/parallel processing capability. A data simulation tool is used to generate a signal as if from the chassis 403, the process is measured and not the data in this instance 404 for verification of transmission of packets. The data is time-stamped with a key value into the data store as a time to live metric 405 and will be removed from the living history when usefulness has passed. The data packet is checked for validity 406 that no errors occurred in the transmission and store of the data against the original data packet sent 404. Statistics on this information are posted 407 for user information and a summary of those statistics are presented as to the error rate and performance 408. Files are then logged to the file on the RAM disk as to what the errors were that occurred 409. The process is then closed out upon user command 410 after hours of testing as to the stability and reliability of the process. The program is self-healing 411 as the others were in trying to reestablish connectivity if necessary from arriving at an error state and then closed when the program is no longer needed 412.

Suitable system engineering software for test, measurement, and control with rapid access to hardware and data insight is LabVIEW, available from National Instruments Corp., Data obtained in LabVIEW Real Time may be captured as a two dimensional array. These data are then posted to the IMNC 32 as a data channel and organized by the source that the data came from to optimize data storage and retrieval.

The use of serialization routines that can read/write from multiple languages, including instrumentation hardware library interfaces and also be fast enough to encode/decode data from large arrays extremely quickly is desired. For example, a Flatten command is useful to transform the 3D test subject 24 data into a 2D representation. In LabVIEW software, available from National Instruments, the Flatten to command has been found to work well and to allow reading from Python into a Numpy array. Such a serialization routine has a relatively low data encoding time of 0.9 ms for one channel operating at 200 kHz for 100 ms to advantageously yield 20,000 values.

TABLE 2

| Data Format | Nominal Run Time |
| --- | --- |
| Labpack | 228 ms |
| Json | 26 ms |
| Flatten String | 0.9 ms |
| Json GCraftsman | 220 ms |
| Flatten xml | 72 ms |
| JsonText | 30 ms |
| Bson Encoder | <=0.9 ms |
| Bson Decoder | <=0.9 ms |

Review of Table 2 shows that for Flatten to commands, Json and Bson are the most viable options based solely on processing speed. Bson is able to use a variety of languages, and therefore preferred for large array encoding/decoding.

Review of Table 2 would appear to show that for Flatten commands, Flatten String, Json and Bson are all viable options with Bson being preferred. Bson is able to use a variety of languages, and therefore might be preferred for large array encoding/decoding. However, only the Flatten String data format command was found to have the required speed, and also to be readable from other open source languages such as Python or Julia. The Flatten String command is therefore preferred to capture data as a one dimensional array, post these data to the IMNC 32 as a data channel and organize data by the source sensor 25.

It was found that keeping the data structure to a simple array of 32 bit doubles, or an array of 64 bit doubles and using the Flatten to String in LabVIEW, the system could quickly decode the string in Python into a Numpy array. The encode/decode time is important to operation of the transfer to IMNC 32 and its use by other machines in either viewers 33 or processing use cases.

The software listed are different data encoding formats that were all usable from functions in LabVIEW. They are not all readable/usable outside of LabVIEW. Only "Flatten to String" was found to have the required speed, and also to be read from other open source languages like Python/Julia.

A more detailed examination into the software that was being performed in BSON routines showed that it was calling the Flatten to String routines. As such it really is the same as Flatten to String. It was found that if keep the data structure to a simple array of 32 bit doubles, or Array of 64 bit doubles and use the Flatten to String in LabVIEW, then could decode string in Python very quickly into Numpy array. The encode/decode time is critical to operation of the Transfer to IMNC 32 and its use by other Machines in either VIEWERS or processing use cases.

When data are stored, the data are assigned a key that is the handle to refer to the push and pull options. This key is connected to the value, which in this case is a very large and deep queue that can be gigabytes in size.

Two feasible and nonlimiting processes for optimizing the IMNC 32 storage for the rapid storage and automatic memory reclamation. One process is to store the elements into a List with a Queue structure having a controlled length. This option allows use of a push operation with a O(1) notation speed and preferably uses the Ltrim operation to limit size. Subsequent testing has shown this architecture supports real time operation where the overall time cost varies from 30 ms to 60 ms, easily meeting the desired time limit of less than 100 ms. Less than 80 ms, less than 60 ms and preferably less than 40 ms.

The second process uses a String Data structure, where each key may be encoded as"PXIeDAS:<ChannelName>:<TimeDataTaken>. Such entries have a set expire value when written so that key and data storage is automatically reclaimed. In use, the first process generally demonstrated a 10 ms time penalty relative to the second process. It is believed this time penalty occurs due to use of a list data structure (first process) versus a string data structure (second process). The overall pull command time has been found to be better for the second option, but an unexpected benefit of the second option is being able to store larger data volumes with high reliability, and to be able to access any channel and time in same overall time.

Figure 9:
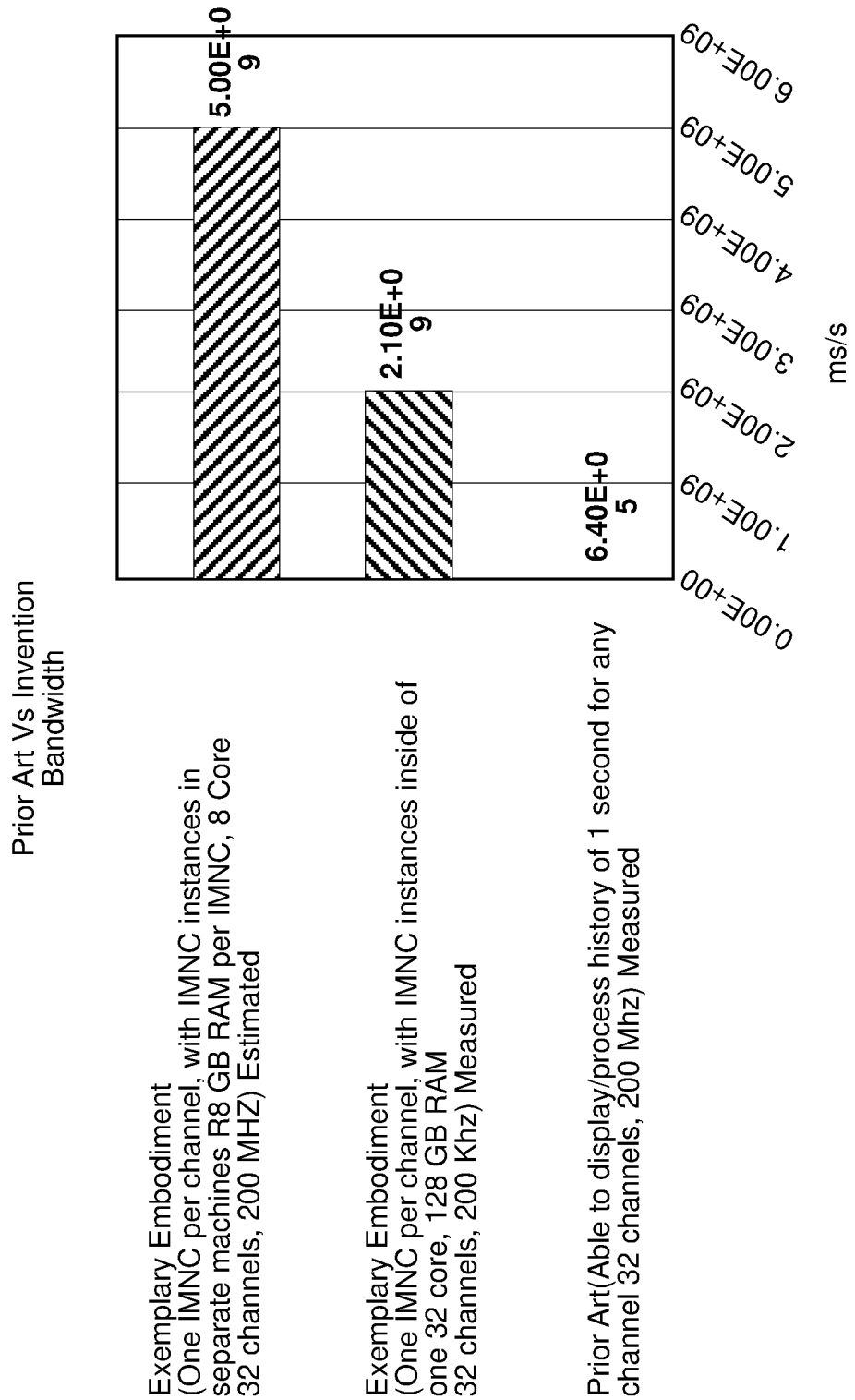
FIG. 9 is a graphical representation of the bandwidth obtainable with the present invention compared to an exemplary prior art system.

Referring to FIGS. 7-9, the second stores data into separate String types. This system may utilize a machine having 32 hyperthreaded CPU's and 128 Gb of memory. This machine may also have 32 instances of the data store, where each instance has its own thread. A HP Z820 workstation has been found suitable. The data posting software may be run on a machine having sufficient IO capability. A Model Precision 7540 laptop with 16 hyperthreaded CPU's and 96 Gb of Ram available from Dell Technologies has been found suitable.

The data posting software may use 32 processes with each process generating and posting one channel of data to a specific data store instance running on the CPU. Each of these data posting processes preferably runs the same software for consistency, which software is cloned 32 times (as shown in FIG. 7) with each of the clones configured to post to different data store instances. A supervisor software may start the 32 posting processes, and also summarize key measurements to a display in real time. Each of the posting processes may write to the workstation, such as a HP Z820 workstation, the data store instance, the status to the Ram disk and a summary of the details to a separate data store, such as MROOT. MROOT is a data store instance that is separate from the data storing instances holding the instrumentation data. Each of the data posting processes provides a summary details to the same instance. Supervisor software can access MROOT to check the status of the posting processes. MROOT has been found configurable to adequately run on the HP 7540 workstation. For reliability, the data posting process preferentially captures information of the process to files on a Ram Disk and to MROOT.

The data reliability posting process is as follows:

1) Each data store saves data into type (strings) holding 100 ms of data for one channel. During generation of data, a large array of double type is encoded in Flatten to String and then to a byte array which is posted to data store. Prior to posting to data store the length of this byte array is captured. After the channel is posted to data store, a command is issued on the data store to read back the transferred length. The posted channel length should agree with the length prior to posting. If not, then an error will be thrown, and then reported in MROOT, and error log files.

2) Each Posting process uses a state machine to automatically handle startup process and fix any connection issues. One state called "Makedata" makes data and post to data store. If any iteration is not in the "Makedata" state then an error is thrown and then reported in MROOT, and error log files.

3) Posting processes use the normal LabVIEW constructs which are passing errors through the entire process. If any part of the posting process has an error, the end step will have an overall error. If an overall error is detected, then an error is thrown in the posting process, and then reported in MROOT, and error log files.

4) If any error is shown, then the data size in bytes, contained in that iteration is deemed in error and reported to the supervisor program, error log files and counted.

5) During operation, each of the 32 posting processes measure the time to generate data and post to data store. Each iteration of the Posting process increments a counter that is called "iteration ctr". This "iteration ctr" is used to alert if an iteration was missed, as well as to relate the ET, and error measurements to specific iteration. This information may be written to files on the Ram disk, as well as to the MROOT data store instance into Lists. This step does not affect the overall error details, but can check status and overall operability of the system.

The posting process to IMNC 32 uses a real time process operating every 100 ms. This posting process is monitored for actual elapsed times (ET) to measure how well the process achieves a less than 100 ms (loop time) for the processes described and claimed herein. It has been observed that ET posting time may be variable. There is a time frame of at least 1, 2, 3, 4 and preferably 5 minutes which may be helpful to determine the distribution of ET values.

A queue buffer between the data generating system and the process that posts to data store is be believed would further reduce ET's. It is desired to monitor these queues for them number of elements in the queue to verify there is no undue lag relative to the data velocity.

In Table 3 the errors recorded for three runs of the proof of concept are shown. Unexpectedly, the measured error rate was 2510 bytes/billion bytes for one run and zero errors for two runs at a sampling rate of 1.0 MHz for 32 channels. This error rate is considered acceptable for most wind tunnel 20 experiments.

TABLE 3

| Run | Duration (hours) | Error Rate (bytes/billion) | Packets Missed | Notes |
| --- | --- | --- | --- | --- |
| 1 | 5 | 2500 | 14 | |
| 2 | 7 | 0 | 0 | Code stopped at 7 hours |
| 3 | 7 | 0 | 0 | Code stopped at 7 hours |

Known software uses individual commands to data store of 12 separate commands to IMNC 32 for each Posting process. Each command requires sending/receiving a return acknowledgement. Even with 10 Gb/s networking, this communication uses between 1 and 3 ms for each command, adding undue overhead for the Posting process. To overcome this problem, the data store may utilize the aforementioned Lua script, or similar, to send a script program with the data. The data store executes the script and posts the data in one network 34 command. This step consolidates the 12 commands to one single command, thereby reducing the overhead of 30 ms to under 5 ms. Furthermore one suitable pull process for data from data store uses individual data store commands. This process could also benefit from using the Lua scripting system by issuing fewer commands that do more and return the requested data.

The runs in Table 3 used two machines with a high core count and memory and utilization of multiple processes on each machine. This architecture was initially believed to help the overall throughput. In practice, the multiple processes on one machine did not isolate well, and required using a single 10 Gb/s port for all data store usage. The single port resulted in a constant 2.1 Gbs network 34 utilization on one NIC. To overcome this problem, one could prophetically put the data store instances on separate physical machines, such that the data store instances would not share the hardware or network 34 interface.

One of skill will recognize, the use of the data storage library system for living history storage with an instrumentation library software allows for easy modularity integrations of instrumentation systems for storage, data manipulation, and live monitoring while normal operational process are performed. Integrations of the instrumentation systems can be tedious in standard acquisition programs and require custom files to permit accessibility and function while inducing higher computational loads on the operating computer. Removing the data holding process to a secondary computer with the library system allows multiple systems to have bi-directional access with permission capability to handle and add to the living history for command and addition. The raw data streams can be left alone and unaltered while additional information is appended to the corresponding data points at a higher rate than normally precedent in the control system that is currently in use for this development. Processing separately is normally not an issue it is combining it with the capability of viewing the information live that is innovative of this system.

The data handler now has capability to capture unpredictable phenomena that the system operators would not know to monitor or not have time to capture. The living history permits capture of past data features of all systems within the time history of the library.

Data loss is prevented by this system since network 34 utility can be optimized to minimize data packet loss while maintaining data synchronization of the multiple systems. The open data source language used is scalable to the size and resources required while maintaining communication to the multiple systems. The living history size can be expanded with very little loss of information or utility of the needs of the network 34 computers.

Figure 10:
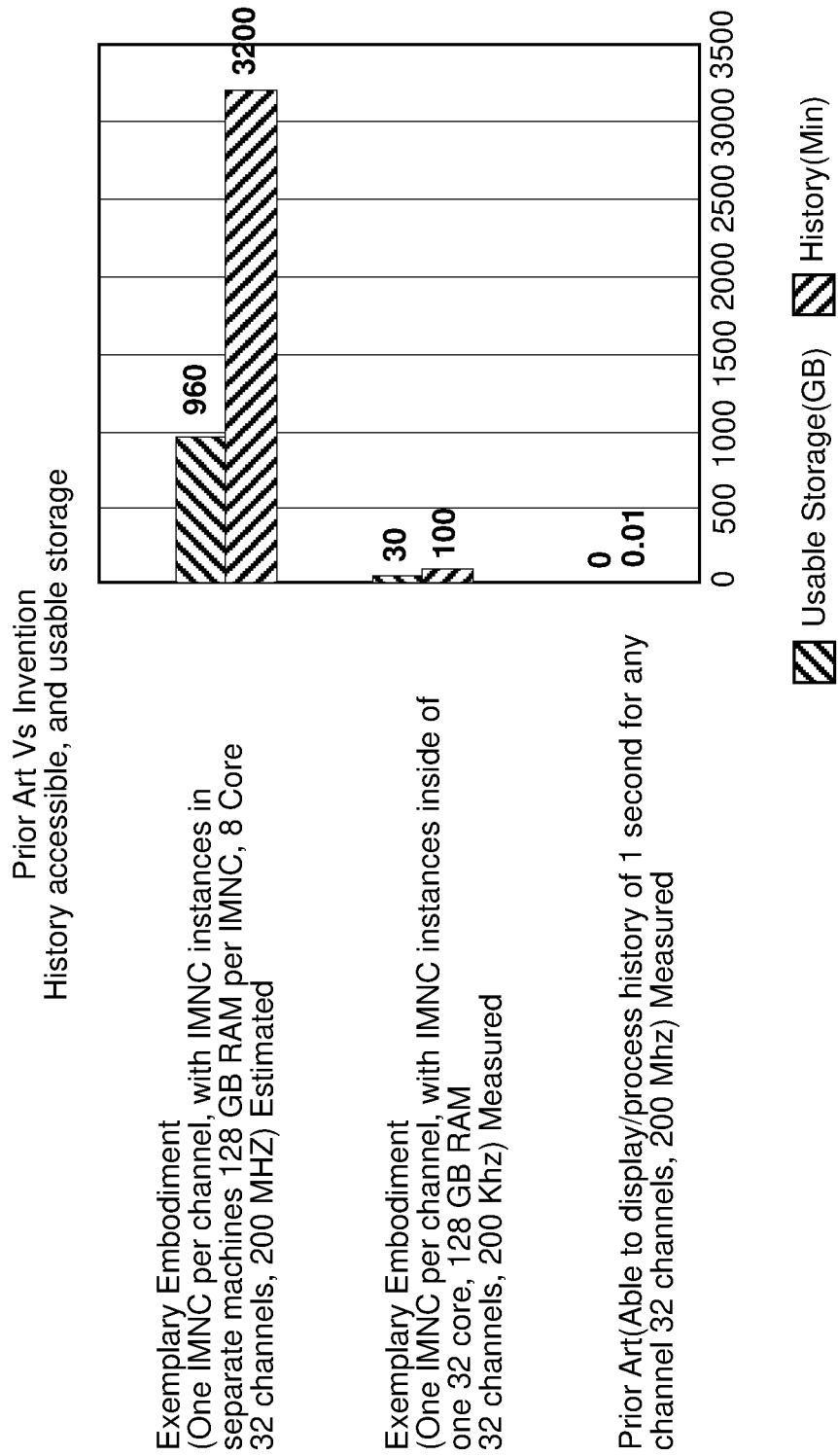
FIG. 10 is a graphical representation of the time history and usable storage of the present invention compared to an exemplary prior art system.
Figure 11:
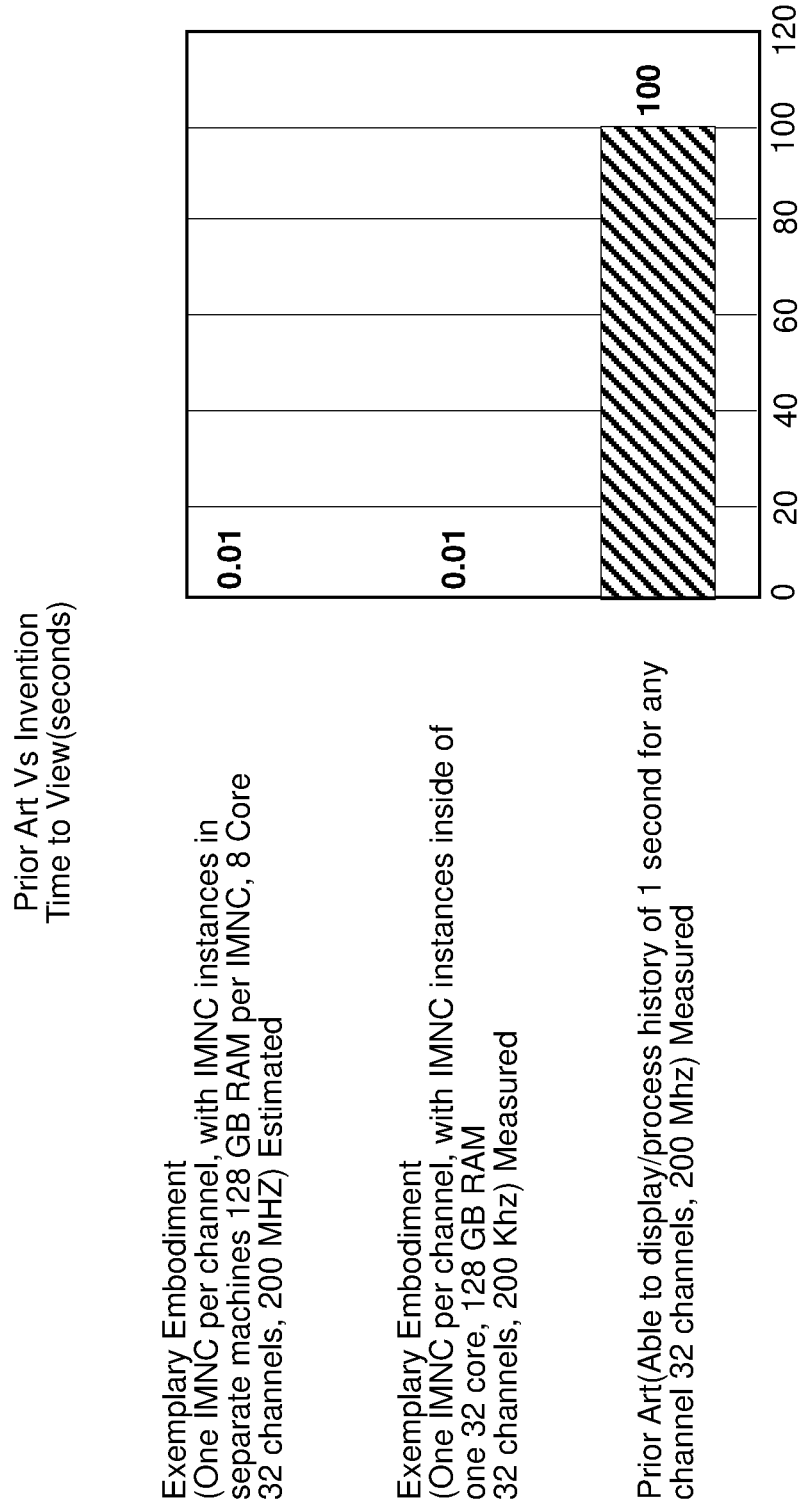
FIG. 11 is a graphical representation of the time in seconds to view collected data of the present invention compared to an exemplary prior art system.

Referring to FIGS. 9-11, nonlimiting 32 channel examples of the present invention are compared to a system from the prior art. FIGS. 9-11 show that unexpectedly the present invention provides each of bandwidth, time history/usable storage and viewing time for the operator.

Referring specifically to FIG. 9, it can be seen that the present invention provides bandwidth orders of magnitude greater than the prior art. The prior art shows an approximately 64 Mb/s bandwidth, while the present invention provides bandwidths in the Gb/s domain. The improvement with the present invention is several orders of magnitude.

Referring specifically to FIG. 10, the present invention provides a time history of several minutes, advantageously allowing the operator to understand how the test object 24 reacts to a greater range of test dynamics than could be accomplished with the prior art. Again, it can be seen again that the present invention provides an improvement over the prior art of several orders of magnitude.

Referring specifically to FIG. 11, it can be seen that the prior art viewing time is measured in tens of seconds, preventing meaningful correction of test conditions on the fly. In contrast, the present invention has a viewing time so fast as to be almost immeasurable, and provides the operator with previously unattainable flexibility in testing. With the present invention, the operator can make responsive adjustments to dynamic test conditions without the need for additional test runs. Again, it can be seen again that the present invention provides an improvement over the prior art of several orders of magnitude.

What is claimed is:

1. An instrumented wind tunnel for testing a test subject, said wind tunnel comprising:
    an inlet, a test stage for receiving a test subject therein, and an exhaust in mutual fluid communication; and
    an instrumentation system comprising: at least 10 sensors for attachment to a test subject, said at least 10 sensors reporting a plurality of data to an IMNC; said IMNC being in communication with at least one viewer via a network having a transmission rate of at least 10 Gb/s.

2. A wind tunnel according to claim 1 wherein said instrumentation system comprises at least 50 sensors.

3. A wind tunnel according to claim 2 having a dedicated channel for each respective sensor, wherein at least two of said channels have mutually different sampling rates, said sampling rates ranging from 20 KHz to 200 KHz.

4. A wind tunnel according to claim 3 wherein at least one said viewer publishes at least one KPI with a latency of 100 ms or less.

5. A wind tunnel according to claim 3 wherein said at least 10 sensors are in communication with a CPU having at least 4 hyperthreaded cores, said CPU being in communication with said IMNC.

6. A wind tunnel according to claim 4 wherein said viewer runs open source software, said open source software comprising a database management operation and a cache in a single program.

7. A wind tunnel according to claim 6 wherein said open source software is configured to receive said plurality of data, post said plurality of data to said at least one viewer, post a status to said at least one viewer and post a time synchronization in a loop, said loop having a run time less than 100 ms.

8. An instrumented wind tunnel for testing a test subject, said wind tunnel comprising:
an inlet, a test stage for receiving a test subject, an exhaust, all in mutual fluid communication; and
an instrumentation system comprising: at least two channels, each said channel comprising a sensor for attachment to a test subject, said sensor being configured to report test data to a respective IMNC having at least a quad core processor; each said IMNC being in communication with a common 10 Gb/s switch, said switch communicating with a respective 10 Gb/s Ethernet card for that channel, said Ethernet card being in communication with a plurality of submasters, each said submaster of said plurality being configured to receive and send said data at a rate of at least 10 Gb/s.

9. A wind tunnel according to claim 8 wherein each said channel comprises at least four submasters, each said submaster comprising at least 64 Gb of RAM.

10. A wind tunnel according to claim 9 wherein said RAM of each said submaster comprises at least 128 Gb of ECC RAM.

11. A wind tunnel according to claim 8 wherein said machine is run by at least 16 Gb of ECC RAM.

12. A wind tunnel according to claim 10 wherein each said channel reports data to a common chassis simulator, said chassis simulator sharding data into a first plurality of channels and a second plurality of channels, each said plurality of channels being in communication with a respective viewer, said viewer being configured to run on open source software comprising database management and cache in a single program, each said viewer being in communication with a respective push-pull machine, said chassis simulator being in further communication with a separate cache machine, said cache machine being in further communication each said push-pull machine.

13. An instrumented wind tunnel for testing a test subject, said wind tunnel comprising:
an inlet, a test stage for receiving a test subject, and an exhaust, all in mutual fluid communication; and
an instrumentation system comprising: at least two channels, each said channel comprising a sensor for attachment to a test subject, said sensor being configured to report test data to a respective IMNC having at least a quad core processor; each said IMNC being in communication with a common 10 Gb/s switch, said switch communicating with a respective 10 Gb/s Ethernet card for that channel, each said Ethernet card being in communication with a plurality of submasters, each said submaster of said plurality being configured to receive and send said data at a rate of at least 10 Gb/s.

14. A wind tunnel according to claim 13 wherein said machine having said hyperthreaded root folder further comprises a cache, said cache being in communication with a first plurality of cloned process RAM caches, each said cloned process being in communication with a respective open source cache database to form a plurality of cache databases, said plurality of cache databases being equal to said plurality of submasters.

15. A wind tunnel according to claim 14 wherein said instrumentation system is configured to store said data using a Flatten to command and to capture said data as a one dimensional array and to organize said data according to a source sensor.

16. A wind tunnel according to claim 15 wherein said instrumentation system is configured to have a buffer for storing said data therein, said buffer being searchable in real time to retrieve a portion of said data during testing.

17. A wind tunnel according to claim 16 wherein said instrumentation system comprises a first plurality of said sensors being configured to post a first portion of said data to a chassis simulator, said chassis simulator being configured to post said data to a viewer and said instrumentation system comprises a second plurality of said sensors being configured to post a second portion of said data to said IMNC.

18. A wind tunnel according to claim 17 wherein at least a portion of said data comprises 3D test data and said instrumentation system comprises a plurality of IMNCs configured to transform said 3D test data into a 2D representation of said 3D test data.

19. A wind tunnel according to claim 18 wherein said instrumentation system is configured to receive, process and store at least 5 minutes of data from at least 32 channels at a sampling rate of at least 100 ms.

* * * * *